US006775420B2

(12) United States Patent
Daly

(10) Patent No.: US 6,775,420 B2
(45) Date of Patent: Aug. 10, 2004

(54) METHODS AND SYSTEMS FOR IMPROVING DISPLAY RESOLUTION USING SUB-PIXEL SAMPLING AND VISUAL ERROR COMPENSATION

(75) Inventor: Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 479 days.

(21) Appl. No.: 09/735,454

(22) Filed: Dec. 12, 2000

(65) Prior Publication Data

US 2003/0206663 A1 Nov. 6, 2003

Related U.S. Application Data

(60) Provisional application No. 60/211,020, filed on Jun. 12, 2000.

(51) Int. Cl.[7] .................................................. G06K 9/40
(52) U.S. Cl. ......................... 382/275; 345/87; 348/606; 382/148
(58) Field of Search ................................. 382/162, 166, 382/167, 168, 189, 210, 214, 237, 254, 255, 260, 261, 262, 263, 264, 265, 267, 274, 275, 194, 221, 148, 149, 150; 345/88, 87, 469, 589, 611, 690; 348/70, 606; 349/82; 358/3.26

(56) References Cited

U.S. PATENT DOCUMENTS

| | | | | | |
|---|---|---|---|---|---|
| 5,254,982 | A | * | 10/1993 | Feigenblatt et al. | ......... 345/690 |
| 5,339,092 | A | * | 8/1994 | Johnson et al. | ............. 345/611 |
| 5,949,428 | A | * | 9/1999 | Toelle et al. | ................ 345/589 |
| 6,020,868 | A | * | 2/2000 | Greene et al. | ................. 345/88 |
| 6,314,207 | B1 | * | 11/2001 | Persiantsev et al. | ........ 382/236 |
| 6,339,426 | B1 | * | 1/2002 | Lui et al. | ..................... 345/467 |
| 6,597,360 | B1 | * | 7/2003 | Stamm et al. | .............. 345/469 |

OTHER PUBLICATIONS

Article Entitled "Full Color Imaging On Amplitude Color Mosaic Displays" by R. Feigenblatt, 1989 Proc. SPIE V. 1075, pp. 199–205.

Article Entitled "Color Matrix Display Image Quality," by J, Kranz and L. Silverstein, 1990 SID Symp. Digest pp. 29–32.

Article Entitled "Color Matrix Display Simulation Based upon Luminance and Chromatic Contrast Sensitivity of Early Vision" by, R. Martin, A. Ahumada and J. Larimer, SPIE. 1992, vol. 1666, pp. 336–342.

Article Entitled "A Spatial Extension Of CIELAB For Digital Color Image Reproduction" by X. Zhang and B. Wandell, SID symp.1996, Digest pp. 731–734.

Article Entitled "Displaced Filtering For Patterned Displays" by C. Bertrisey, et al, 2000, SID00 Symposium Digest, pp. 296–299.

Article Entitled "Visible Differences Predictor" by S. Daly,, Ch 14 Digital Images and Human Vision, 1993, MIT Press pp. 181–206.

Article Entitled "A Visual Discrimination Model For Imaging System Design And Evaluation" Ch. 10 of Vision Models for Target Detection and Recognition, By J.Lubin, 1995, World Scientific Press.

* cited by examiner

*Primary Examiner*—Bhavesh M. Mehta
*Assistant Examiner*—Seyed Azarian
(74) *Attorney, Agent, or Firm*—Chernoff, Vilhauer, McClung & Stenzel, LLP

(57) ABSTRACT

Embodiments of the present invention provide systems and methods for converting a high-resolution image to a lower-resolution image with reduced visible errors. These systems and methods comprise a sub-pixel sampling simulation performed on a high-resolution image to determine an error introduced into the high-resolution image as a result of sub-pixel sampling. This error may be isolated from the high-resolution image to create an error image which may be modified with a visual model to remove invisible errors thereby creating a visible error image. The visual error image may then be combined with said high-resolution image to create a compensated image that will substantially cancel the error introduced as a result of subsequent sub-pixel sampling when the sub-pixel sampling occurs.

24 Claims, 8 Drawing Sheets

METHODS AND SYSTEMS FOR IMPROVING DISPLAY RESOLUTION USING SUB-PIXEL SAMPLING AND VISUAL ERROR COMPENSATION

CROSS-REFERENCE TO RELATED APPLICATIONS

This application claims the benefit of U.S. Provisional Patent Application No. 60/211,020, filed Jun. 12, 2000.

The subject matter of this application is related to an application entitled "Methods and Systems for Improving Display Resolution in Achromatic Images Using Sub-Pixel Sampling and Visual Error Filtering" invented by Rajesh Reddy K. Kovvuri and Scott Daly and filed on the same date as this application under. SLA 0331 with Express Mailing Label No. EF 244380515 US and given U.S. patent Ser. No. 09/735,425, said application is hereby incorporated herein by reference.

The subject matter of this application is also related to an application entitled "Methods and Systems for Improving Display Resolution in Images using Sub-Pixel Sampling and Visual Error Filtering" invented by Scott Daly and Rajesh Reddy K. Kovvuri and filed on the same date as this application under SLA 0356 with Express Mailing Label No. EF 244380529 US and given U.S. patent Ser. No. 09/735,425, said application is hereby incorporated herein by reference.

THE FIELD OF THE INVENTION

Embodiments of the present invention relate to the field of displaying high resolution images on displays with lower resolution, where the displays use a triad arrangement to display the R, G, and B components of the image. This triad arrangement is common in direct view LCD displays, for example, and in such an arrangement a single pixel is composed of 3 side-by-side subpixels. Each subpixel controls only one of the three primaries (i.e., R, G and B) and is, in turn, usually controlled solely by the primaries of the digital image representation. The high-resolution image may be available in memory, or may be available directly from an algorithm (vector graphics, some font designs, and computer graphics).

BACKGROUND

The most commonly used method for displaying high-resolution images on a lower resolution display is to sample the pixels 2 of the high-resolution image 4 down to the resolution of the low-resolution display 6, as shown in FIG. 1. Then, the R, G, B values of each downsampled color pixel 8 are mapped to the separate R, G, B elements 10, 12 and 14 of each display pixel 16. These R, G, B elements 10, 12 and 14 of a display pixel are also referred to as subpixels. Because the display device does not allow overlapping color elements, the subpixels can only take on one of the three R, G, or B colors, however, the color's amplitude can be varied throughout the entire greyscale range (e.g., 0–255). The subpixels usually have a 1:3 aspect ratio (width:height), so that the resulting pixel 16 is square. The subsampling/mapping techniques do not consider the fact that the display's R, G, and B subpixels are spatially displaced; in fact they are assumed to be overlapping in the same manner as they are in the high-resolution image. This type of sampling may be referred to as sub-sampling or traditional sub-sampling.

The pixels of the high-resolution image 4 are shown as three slightly offset stacked squares 8 to indicate their RGB values are associated for the same spatial position (i.e., pixel). One display pixel 16, consisting of one each of the R, G and B subpixels 10, 12 and 14 is shown as part of the lower-resolution triad display 6 in FIG. 1 using dark lines. Other display pixels are shown with lighter gray lines.

In this example, the high-resolution image has 3× more resolution than the display (in both horizontal and vertical dimensions). Since this direct subsampling technique causes aliasing artifacts, various methods are used, such as averaging the neighboring unsampled pixels in with the sampled pixel. Note that the common technique of averaging neighboring elements while subsampling is mathematically equal to prefiltering the high resolution image with a rectangular (rect) filter. Also, note that techniques of selecting a different pixel than the leftmost (as shown in this figure) can be considered as a prefiltering that affects only phase. Thus, most of the processing associated with preventing aliasing can be viewed as a filtering operation on the high-resolution image, even if the kernel is applied only at the sampled pixel positions.

It has been realized that the aforementioned technique does not take advantage of potential display resolution. Background information in this area may be accessed by reference to R. Fiegenblatt (1989), "Full color imaging on amplitude color mosaic displays" Proc. SPIE V. 1075, 199–205; and J. Kranz and L. Silverstein (1990) "Color matrix display image quality: The effects of luminance and spatial sampling," SID Symp. Digest 29–32 which are hereby incorporated herein by reference.

For example, in the display shown in FIG. 1, while the display pixel 16 resolution is ⅓ that of the high resolution image (source image) 4, the subpixels 10, 12 and 14 are at a resolution equal to that of the source (in the horizontal dimension). If this display were solely to be used by colorblind individuals, it would be possible to take advantage of the spatial positions of the subpixels. This approach is shown in FIG. 2 below, where the R, G, and B subpixels 10, 12 and 14 of the display are taken from the corresponding colors of different pixels 11, 13 and 15 of the high-resolution image. This allows the horizontal resolution to be at the subpixel resolution, which is 3× that of the display pixel resolution.

But what about the viewer of the display who is not color-blind? That is, the majority of viewers. Fortunately for display engineers, even observers with perfect color vision are color blind at the highest spatial frequencies. This is indicated below in FIG. 3, where idealized spatial frequency responses of the human visual system are shown.

Here, luminance 17 refers to the achromatic contact of the viewed image, and chrominance 19 refers to the color content, which is processed by the visual system as isoluminant modulations from red to green, and from blue to yellow. The color difference signals R-Y and B-Y of video are rough approximations to these modulations. For most observers, the bandwidth of the chromatic frequency response is ½ that of the luminance frequency response. Sometimes, the bandwidth of the blue-yellow modulation response is even less, down to about ⅓ of the luminance. Sampling which comprises mapping of color elements from different image pixels to the subpixels of a display pixel triad maybe referred to as sub-pixel sampling.

With reference to FIG. 4, in the horizontal direction of the display, there is a range of frequencies that lie between the Nyquist of the display pixel 16 (display pixel=triad pixel, giving a triad Nyquist at 0.5 cycles per triad pixel) and the Nyquist frequency of the subpixels elements 10, 12 and 14

(0.5 cycles per subpixel=1.5 cycles/triad pixels). This region is shown as the rectangular region 20 in FIG. 4. The resulting sinc functions from convolving the high resolution image with a rect function whose width is equal to the display sample spacing is shown as a light dashed-dot curve 22. This is the most common approach taken for modeling the display MTF (modulation transfer function) when the display is an LCD.

The sinc function resulting from convolving the high-res source image with a rect equal to the subpixel spacing is shown as a dashed curve 24, which has higher bandwidth. This is the limit imposed by the display considering that the subpixels are rect in ID. In the shown rectangular region 20, the subpixels can display luminance information, but not chromatic information. In fact, any chromatic information in this region is aliased. Thus, in this region, by allowing chromatic aliasing, we can achieve higher frequency luminance information than allowed by the triad (i.e., display) pixels. This is the "advantage" region afforded by using sub-pixel sampling.

For applications with font display, the black & white fonts are typically preprocessed, as shown in FIG. 5. The standard pre-processing includes hinting, which refers to the centering of the font strokes on the center of the pixel, i.e., a font-stroke specific phase shift. This is usually followed by low-pass filtering, also referred to as greyscale antialiasing.

The visual frequency responses (CSFs) shown in FIG. 3 are idealized. In practice, they have a finite falloff slope, as shown in FIG. 6A. The luminance CSF 30 has been mapped from units of cy/deg to the display pixel domain (assuming a viewing distance of 1280 pixels). It is shown as the solid line 30 that has a maximum frequency near 1.5 cy/pixel (display pixel), and is bandpass in shape with a peak near 0.2 cy/pixel triad. The R:G CSF 32 is shown as the dashed line, that is lowpass with a maximum frequency near 0.5 cy/pixel. The B:Y modulation CSF 34 is shown as the dashed-dotted LPF curve with a similar maximum frequency as the R:G CSF, but with lower maximum response. The range between the cutoff frequencies of the chroma CSF 32 and 34 and the luminance CSF 30 is the region where we can allow chromatic aliasing in order to improve luminance bandwidth.

FIG. 6A also shows an idealized image power spectra 36 as a 1/f function, appearing in the figure as a straight line with a slope of −1 (since the figure is using log axes). This spectrum will repeat at the sampling frequency. These repeats are shown for the pixel 38 and the subpixel 40 sampling rates for the horizontal direction. The one occurring at lower frequencies 38 is due to the pixel sampling, and the one at the higher frequencies 40 is due to the subpixel sampling. Note that the shapes change since we are plotting on a log frequency axis. The frequencies of these repeat spectra that extend to the lower frequencies below Nyquist are referred to as aliasing. The leftmost one is chromatic aliasing 38 since it is due to the pixel sampling rate, while the luminance aliasing 40 occurs at higher frequencies because it is related to the higher sub-pixel sampling rate.

In FIG. 6A, no prefiltering has been applied to the source spectra. Consequently, aliasing, due to the pixel sampling (i.e., chromatic aliasing), extends to very low frequencies 35. Thus even though the chromatic CSF has a lower bandwidth than the luminance CSF, the color artifacts may still be visible (depending on the noise and contrast of the display).

In FIG. 6B, we have applied the prefilter (a rect function equal to three source image pixels), shown in FIG. 4 as a dashed-dotted line 22, to the source power spectrum, and it can be seen to affect the baseband spectrum 42 past 0.5 cy/pixel, causing it to have a slope steeper than −1 shown at 44. The repeats also show the effect of this prefilter. Even with this filter, we see that some chromatic aliasing (the repeated spectrum at the lower frequencies) occurs at frequencies 46 lower than the cut-off frequency of the two chrominance CSFs 32a and 34a. Thus it can be seen that simple luminance prefiltering will have a difficult time removing chromatic aliasing, without removing all the luminance frequencies past 0.5 cy/pix (i.e., the "advantage" region).

Since we are relying on the visual system differences in bandwidth as a function of luminance or chrominance to give us a luminance bandwidth boost in the "advantageous region" 20, one possibility is to design the prefiltering based on visual system models as described in C. Betrisey, et al (2000), "Displaced filtering for patterned displays," SID Symposium digest, 296–299, hereby incorporated herein by reference and illustrated in FIG. 7.

This technique ideally uses different prefilters depending on which color layer, and on which color subpixel the image is being sampled for. Thus there are 9 filters. They were designed using a human visual differences model described in X. Zhang and B. Wandell (1996) "A spatial extension of CIELAB for digital color image reproduction," SID Symp. Digest 731–734, incorporated herein by reference and shown in the FIG. 7. This was done offfine, assuming the image is always black & white. In the final implementation, rect functions rather than the resulting filters are used in order to save computations. In addition, there is still some residual chromatic error that can be seen because the chromatic aliasing extends down to lower frequencies than the chromatic CSF cutoff (as seen in FIG. 6B). However, the visual model used does not take into account the masking properties of the visual system which cause the masking of chrominance by luminance when the luminance is at medium to high contrast levels. So, in larger fonts the chromatic artifacts, which lie along the edges of the font, are masked by the high luminance contrast of the font.

However, as the font size is reduced the luminance of the font reduces, and then the same chromatic artifacts become very visible (at very small fonts for example, the b/w portion of the font disappears, leaving only a localized color speckle).

SUMMARY OF THE INVENTION

Embodiments of the present invention comprise methods and systems that rely less on filtering and its assumptions of linearity. These embodiments can take into account the specific localized phases of the various fontstrokes, or other image features. The methods of embodiments of the present invention are compensation based, wherein a signal is added to the image that will cancel out the chromatic errors caused by the subpixel addressing. In some embodiments, only the lower frequency chromatic artifacts are cancelled, since the high frequency artifacts cannot be seen due to the lower bandwidth of the chromatic CSFs, as shown in FIG. 6A.

Embodiments of the present invention provide for higher resolution luminance signals with reduced visibility of chromatic aliasing, particularly when the display is viewed no closer than designed specifications. Furthermore, the methods of the present invention are Page 8 not restricted to use with black & white source images or text documents. These methods can enhance the horizontal resolution for color images in general. Also, by using more advanced embodiments, the human visual effect of masking can be taken into account, allowing for higher luminance edge enhancement by allowing more chromatic aliasing near high-contrast luminance edges.

Embodiments of the present invention convert a high-resolution image to a lower-resolution image by an error reducing method which yields a lower-resolution image which more accurately represents the original high-resolution image. A high-resolution image may be sampled in a sub-pixel sampling simulation to simulate the visible error caused by sub-pixel sampling. Since the sampling is only simulated, the resolution does not have to change. Once the error has been determined, the error can be subtracted from the original image to create an error image. A visual model may then be used to remove non-visually-detectable information from the error image creating a modified error image which represents the visible error. This modified visible error image may be referred to as the compensated image.

This compensated image may then be added to the original image thereby adding to the original image the error that will, subsequently, be removed during sub-pixel sampling. The compensated image is then sampled using a sub-pixel sampling process wherein the added error is removed as a result of the process and an improved lower-resolution image results.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The currently preferred embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Figure 1:
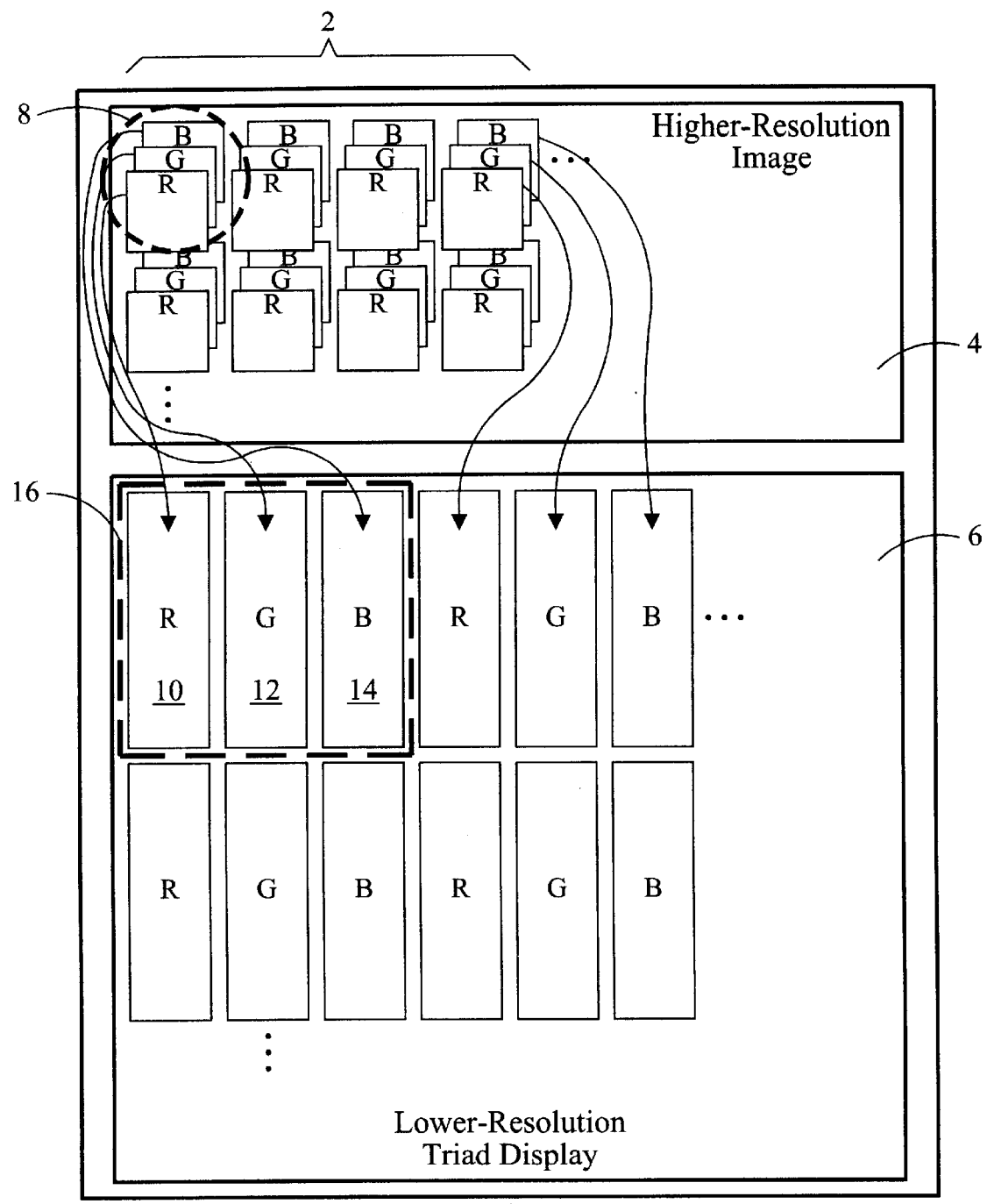
FIG. 1 is a diagram showing traditional image sampling for displays with a triad pixel configuration.
Figure 2:
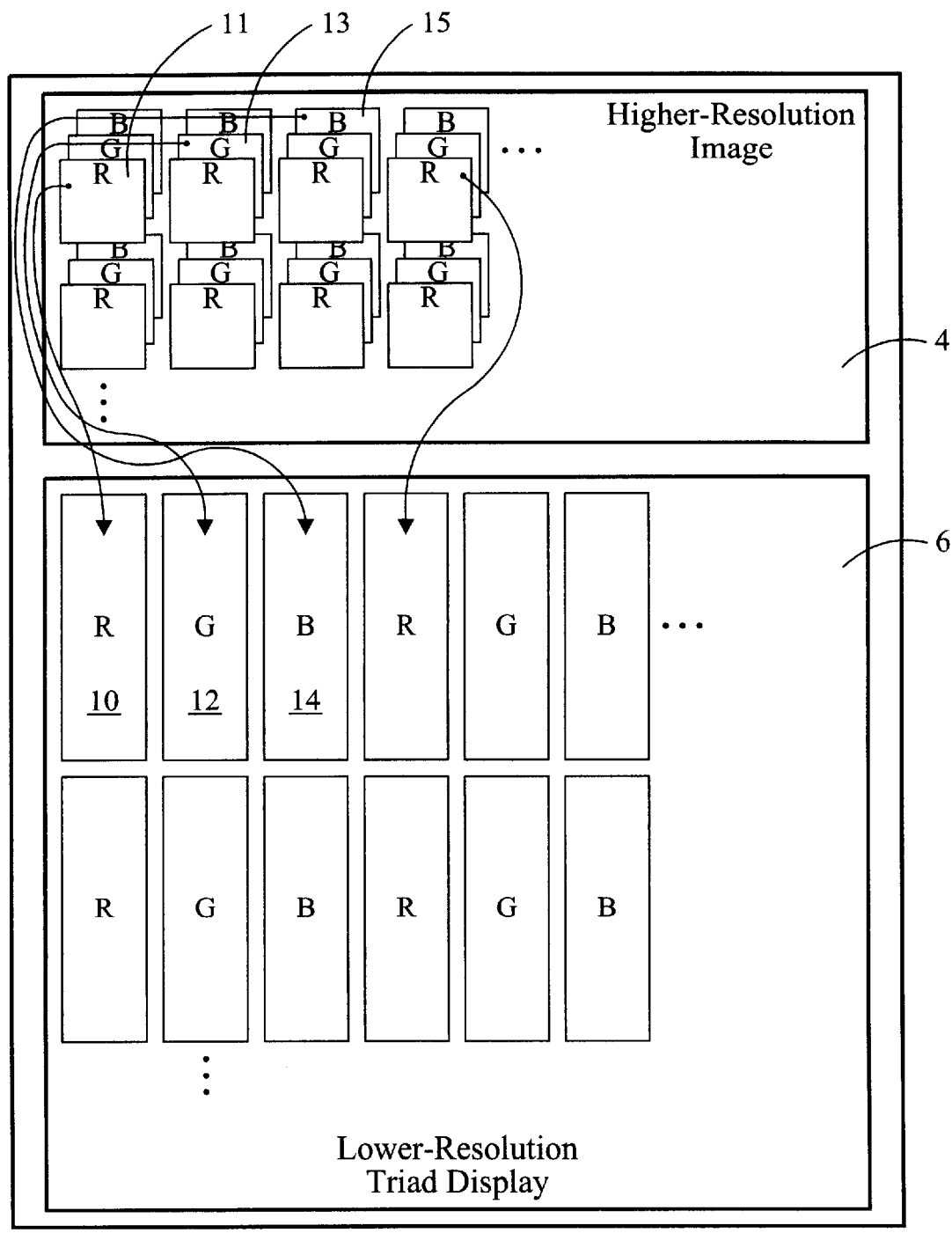
FIG. 2 is a diagram showing sub-pixel image sampling for a display with a triad pixel configuration.
Figure 3:
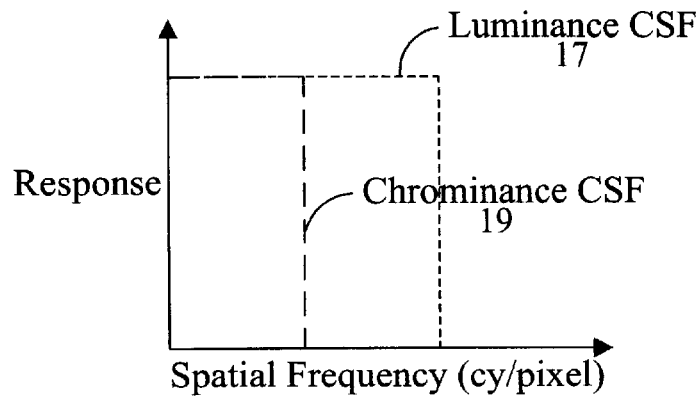
FIG. 3 is a graph showing idealized CSFs mapped to a digital frequency plane.
Figure 4:
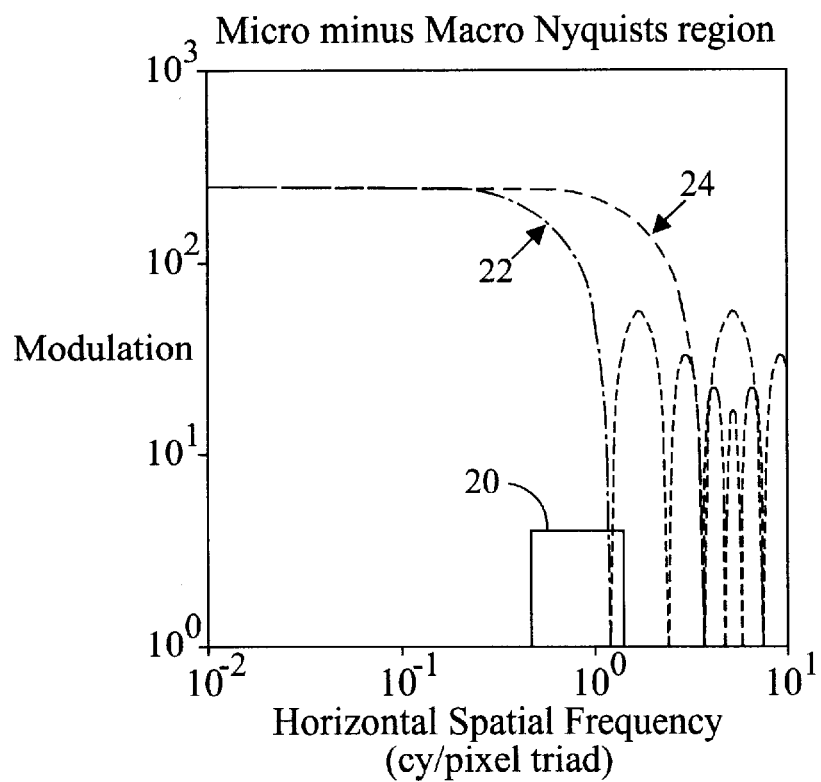
FIG. 4 is a graph showing an analysis of the pixel Nyquist and sub-pixel Nyquist regions which denotes the advantage region.
Figure 5:
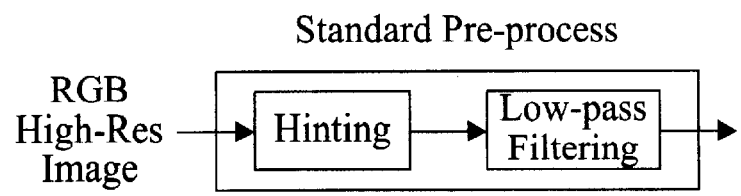
FIG. 5 shows typical pre-processing techniques.
Figure 6A:
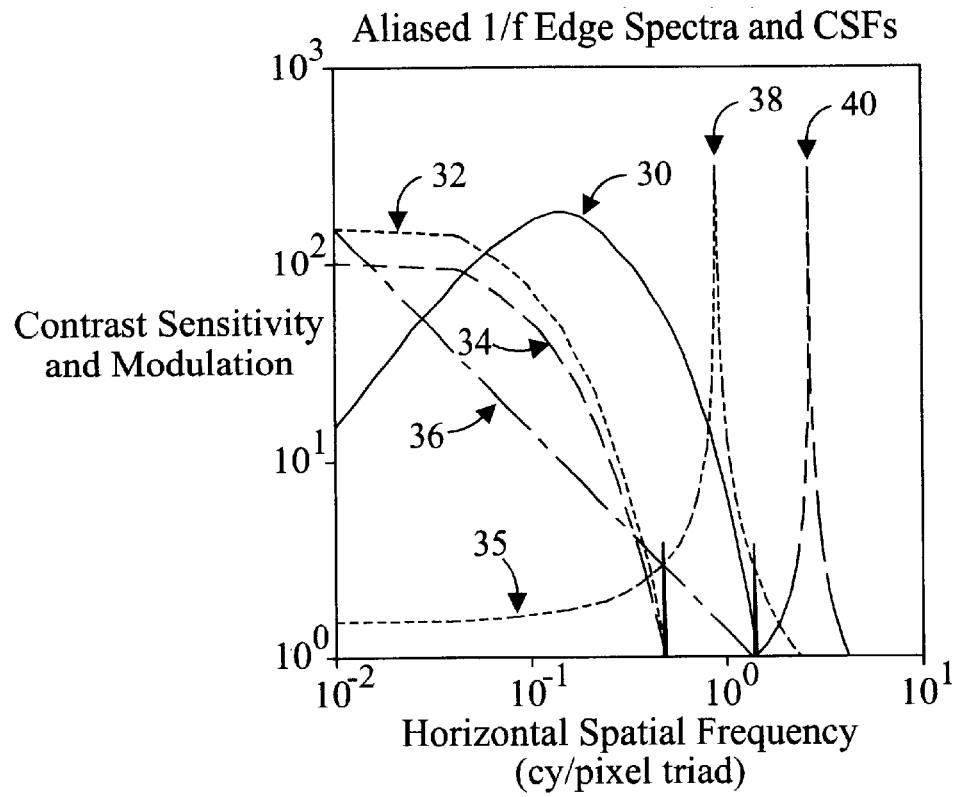
FIG. 6A is a graph showing an analysis using 1/f-power spectra repeated at pixel sampling and sub-pixel sampling frequencies.
Figure 6B:
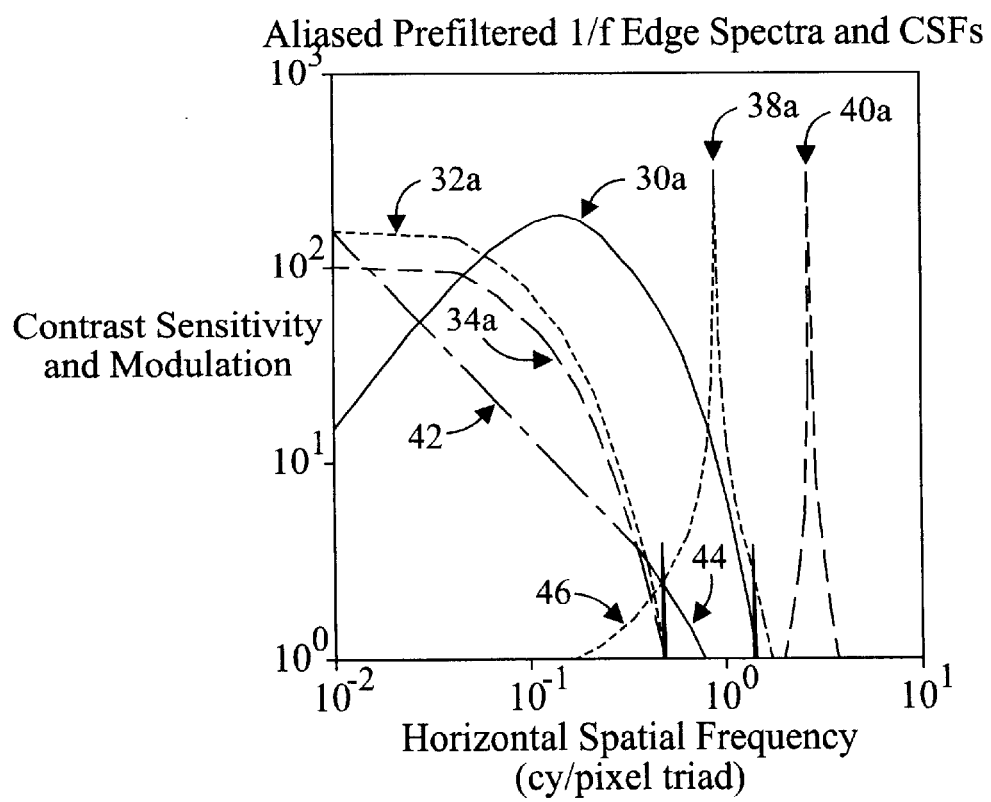
FIG. 6B is a graph showing an analysis using 1/f-power spectra repeated at pixel sampling and sub-pixel sampling frequencies with improvements due to pre-processing.
Figure 7:
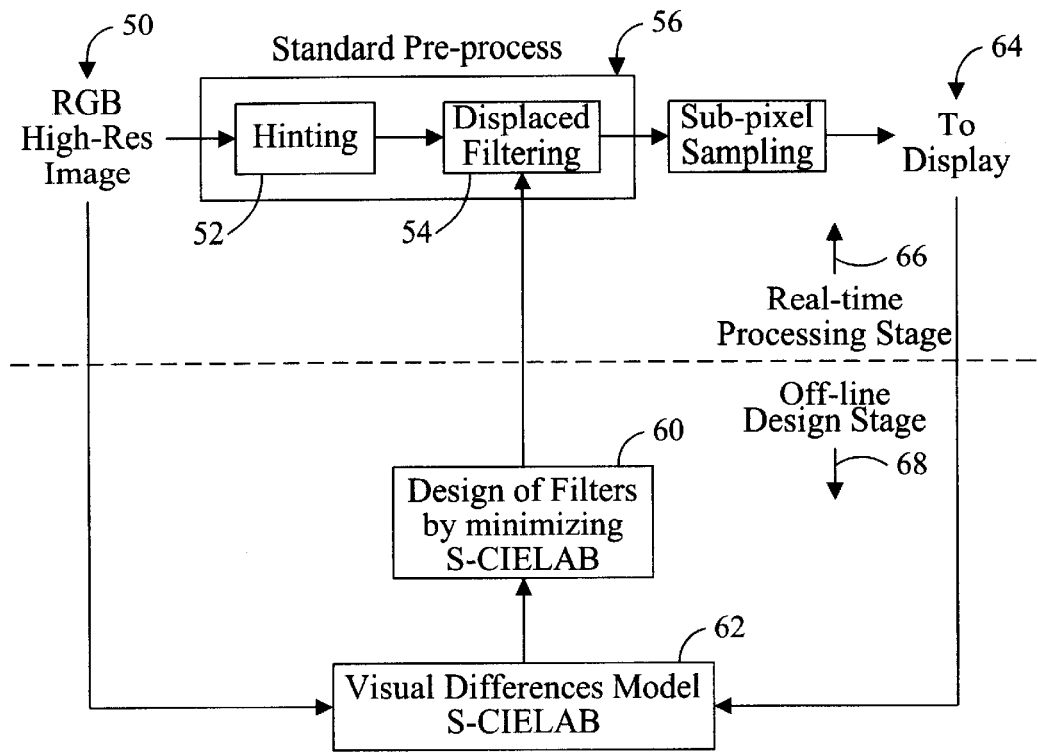
FIG. 7 is a block diagram showing a known use of a visual model.
Figure 8:
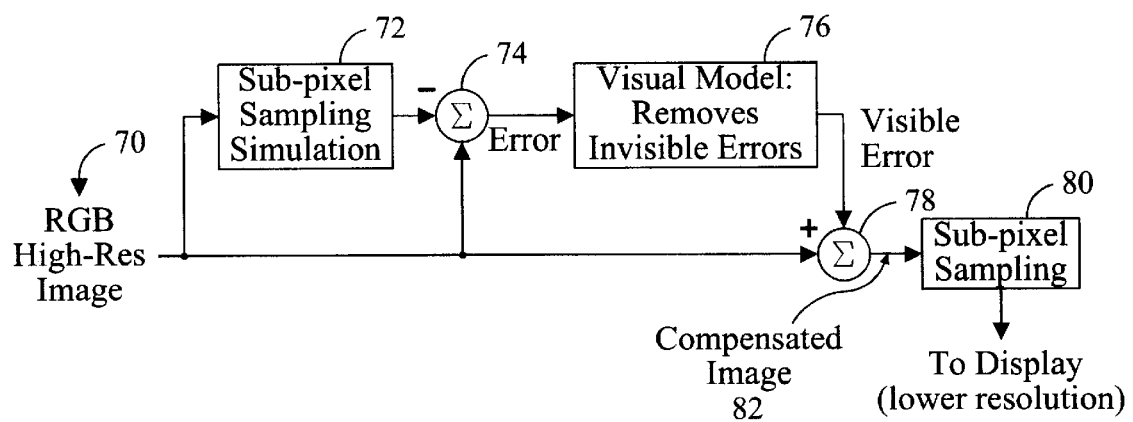
FIG. 8 is a block diagram showing a general embodiment of the present invention.

Some embodiments of the present invention are summarized in the block diagram shown in FIG. 8 wherein a high-resolution image, such as RGB high-resolution image 70, is modified. High-resolution image 70 is sampled in a sub-pixel sampling simulation 72 to simulate the visible error caused by sub-pixel sampling. Since the sampling is only simulated, the resolution does not have to change. Once the error has been ascertained, the error can be subtracted 74 from the original image 70. A visual model 76, then removes non-detectable information from the error image creating a modified error image which represents the visible error. This modified error image may be referred to as the compensated image and is not limited to the 0–255 R, G, B range of the source image 70, as it allows for the use of negative values.

The compensated image is then added to the original image 70 thereby adding to the original image 70 the error that will be removed during sub-pixel sampling. The compensated image 82 is then sampled using a sub-pixel sampling process 80 wherein the added error is removed as a result of the process and an improved lower-resolution image results.

A key aspect is that the visible error that is caused by the sub-pixel sampling is simulated and then isolated from the high-resolution source image. The simulation is maintained at the same resolution as the higher resolution source image. When such an error is added by the subpixel sampling process, it will be cancelled out in the final image.

These methods of embodiments of the present invention make it possible to cancel out the chromatic aliasing occurring at the lower frequencies. Since chromatic aliasing frequencies that are originally so high that they fold over at the Nyquist to very low frequencies are the most visible, these are the ones of primary concern.

The visual model 76 of embodiments of the present invention is of a different form than the known model used in the Betrisey approach. In known models, such as Betrisey, the visual model is a difference metric where two images are input and the output is an image indicating where visual differences occur. In the Betrisey approach, this image of visible differences is integrated in a squared form to arrive at a single number metric. These known models are described in X. Zhang and B Wandell (1996), "A spatial extension of CIELAB for digital color image reproduction, SID Symposium Digest 731–734; C. Betrisey, et al. (2000), "Displaced filtering for patterned displays," SID Symposium Digest, 296–299; and S. Daly (1993), "Visible Differences Predictor," Ch. 14 of Digital Images and Human Vision, ed. by A. B. Watson, MIT Press. These references are incorporated herein by reference.

In embodiments of the present invention, however, the form of the visual model 76 is to remove image content that is not visible to the eye. Consequently, the visual model does not compute the visible difference between images, but rather acts on a single image. One way to achieve this is to filter by the appropriate CSFs and core by the threshold. In FIG. 8, the visual model 76 is shown in generic form.

Figure 9:
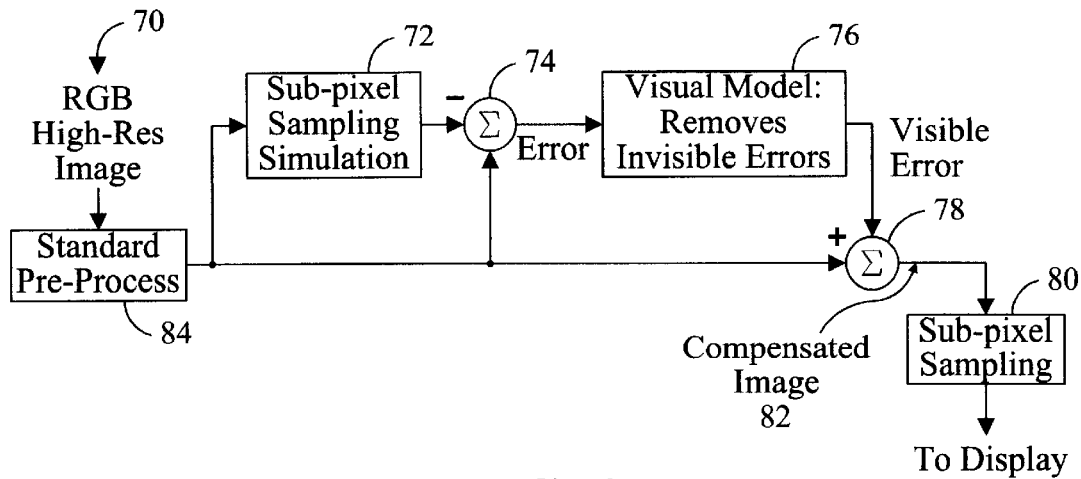
FIG. 9 is a block diagram showing an embodiment of the present invention which employs pre-processing.

In reference to FIG. 9, the methods of the present invention can be used in conjunction with standard pre-process methods 84, such as the more traditional techniques of hinting and low-pass filtering. Once standard pre-process methods 84 are performed, the image is treated in the same manner as those without pre-process methods. That is, High-resolution image 70 is pre-processed 84 followed by sampling in a sub-pixel sampling simulation 72 to simulate the visible error caused by sub-pixel sampling. Once the error has been ascertained, the error can be subtracted 74 from the original image 70. A visual model 76, then removes non-detectable information from the error image creating a modified error image which represents the visible error. The compensated image is then added to the original image 70 thereby adding the error that will be removed during actual sub-pixel sampling 80. The compensated image 82 is then sampled using a sub-pixel sampling process 80 wherein the added error is removed as a result of the process and an improved lower-resolution image results.

Figure 10:
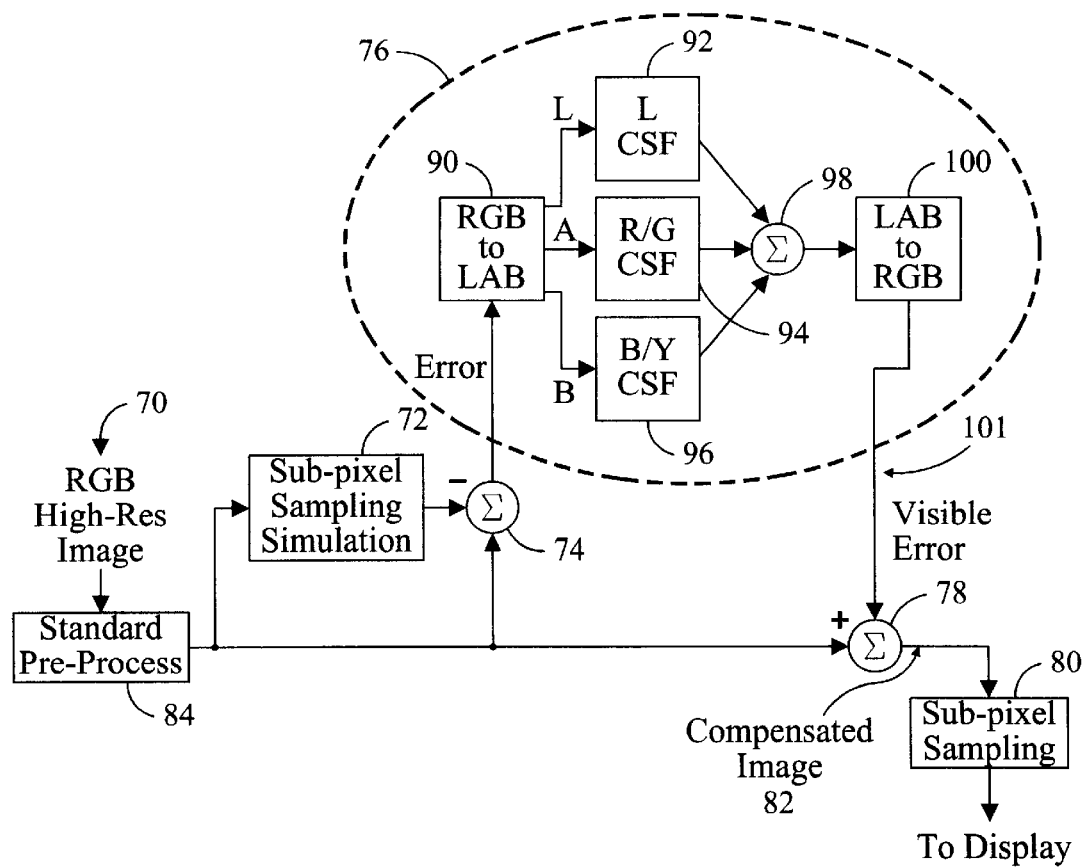
FIG. 10 is a block diagram showing an embodiment of the present invention which uses filtering of separated luminance and chrominance channels.

Many embodiments of visual model 76 may be used in conjunction with embodiments of the present invention. In reference to FIG. 10, a simple first embodiment of the present invention is explained in which a high-resolution image 70 is processed. Image 70 may be pre-processed 84 if desired by a user or processed directly without pre-processing. The image 70 is run through sub-pixel sampling simulation 72 to determine the error associated with sub-pixel sampling. The error is then subtracted 74 from original image 70 to produce an error image which is processed through visual model 76. In this embodiment, visual model 76 comprises a conversion 90 from RGB to LAB. This conversion 90 results in an image expressed in three channels which isolate luminance characteristics from chromatic characteristics. While several color models may be used, the CIELAB model is exemplary and an equivalent model is preferred in this simple embodiment. A simpler embodiment using linear Y, R-Y, and B-Y signals is also possible.

Once the error image has been converted, the luminance channel 92 and the chrominance channels 94 and 96 are filtered to remove the invisible error from the error image. In preferred embodiments, these filtering operations typically comprise filtering and a spatial coring operation to remove localized frequencies whose amplitudes are too small to see. Different filters may be used for each channel and some channels may not be filtered as required for specific applications, however filtering is generally a frequency specific operation. Typically, the luminance channel 92 will be filtered separately from the chrominance channels 94 and 96.

After filtering, the channels 92, 94 and 96 are combined 98 into a single LAB format image which represents the visible error associated with sub-pixel sampling. This LAB visible error image is subsequently re-converted 100 back to an RGB format visible error image 101. The RGB visible error image 101 is then combined 78 with the original image 70 to form a compensated image 82 which compensates for errors introduced through sub-pixel sampling. This compensated image 82 is then sampled using sub-pixel sampling 80 wherein the added visible error compensation 101 is cancelled in the sampling process yielding a lower-resolution image with fewer errors than one created through simple sub-pixel sampling alone.

Figure 11:
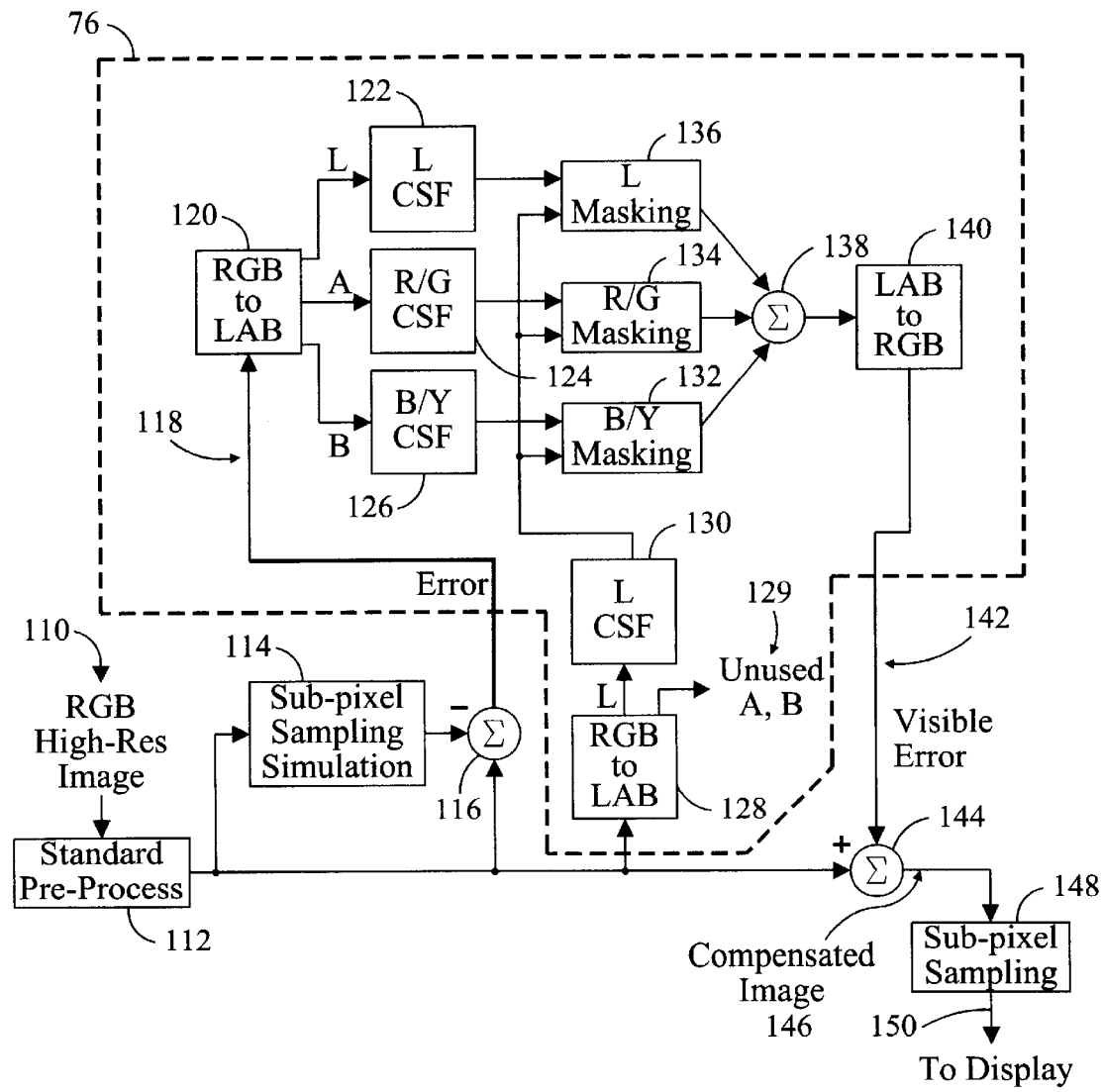
FIG. 11 is a block diagram of an embodiment of the present invention which employs a visual model utilizing masking of chroma by luminance.

In a second embodiment of the present invention, as illustrated in FIG. 11, edge effects or masking as well as frequency effects are treated. Generally, the methods of embodiments of the present invention are performed on a high-resolution image such as RGB high-resolution image 110. Pre-processing 112 may be performed prior to applying the methods of embodiments of the present invention, but is not required.

High-resolution image 110 is run through a sub-pixel sampling simulation 114 which determines the error introduced during sub-pixel sampling by performing the sampling simulation and converting the sampled image to its original resolution for comparison to the original. The sampled and converted image is compared 116 to the original image to determine the error associated with sub-pixel sampling. This error is subtracted from the original image thereby creating an error image 118 which is sent to a visual model 76 for further treatment.

Within the visual model 76, the error image, in a RGB or similar format is converted 120 to a LAB or similar format thereby segregating luminance data from chrominance data. After conversion to a luminance-segregated format, such as LAB, the separate channels of luminance 122 and chrominance 124 and 126 are filtered according to frequency relationships as described above for other embodiments.

After filtering 122, 124 and 126, this embodiment of the present invention takes into account the visual property of masking, particularly the masking of chrominance by luminance. The masking signal is taken from the source image 110 content rather than the error image. The source image 110 is converted 128 to a luminance-segregated format such as LAB from which the luminance data is extracted 130. In some embodiments, only the luminance channel 136 is masked, however, chromatic channels 134 and 132 may also be masked. Masking is performed as a pixel-wise comparison to account for edge effects. Contrast is an amplitude differential signal, for example, subtracting the mean of the entire L image from the L image then using the absolute value as being proportional to contrast. A higher contrast signal level in L at a given position causes more masking of the L, R/G and B/Y signals at the same position. The masking is simulated by dividing these signals by the mask signal output from step 130, and then coring. Coring is a process by which a signal's value is changed to zero when the absolute value of the signal amplitude becomes less than a given threshold value.

Once masking has taken place, the segregated channels are joined 138 back into a combined format such as LAB 138 and the combined format file is then converted 140 back to the original image format, for example RGB. The resulting image represents the visible error 142 associated with sub-pixel sampling.

This resulting error image 142 is subsequently combined with the original high-resolution image 144 to create a compensated image 146 in which a correction is introduced which is substantially similar, but opposite to the error introduced during sub-pixel sampling. This compensated image 146, when actually sampled 148 will result in a display image 150 which contains fewer errors than a directly sampled image without error correction. This is due to the cancellation of the sampling errors by the visible error 142 introduced 144 before sampling 148.

This second embodiment of the present invention, as illustrated in FIG. 11, can only crudely model the masking effect, since in the actual visual masking process, only signals within a limited range near the similar frequency of the mask are masked, as well as a limited spatial region. However, for images consisting solely of edges and lines, a 1/f-power spectra may be assumed. Thus at any given frequency and orientation, the signal content at higher frequencies with the same orientation will be less. Thus this approach will overestimate masking, but since that will result in more error content in the compensated image, the net effect is that more chromatic aliasing is removed than necessary. This will result in less luminance sharpness, but it will still be more than methods that do not use masking aspects.

Figure 12:
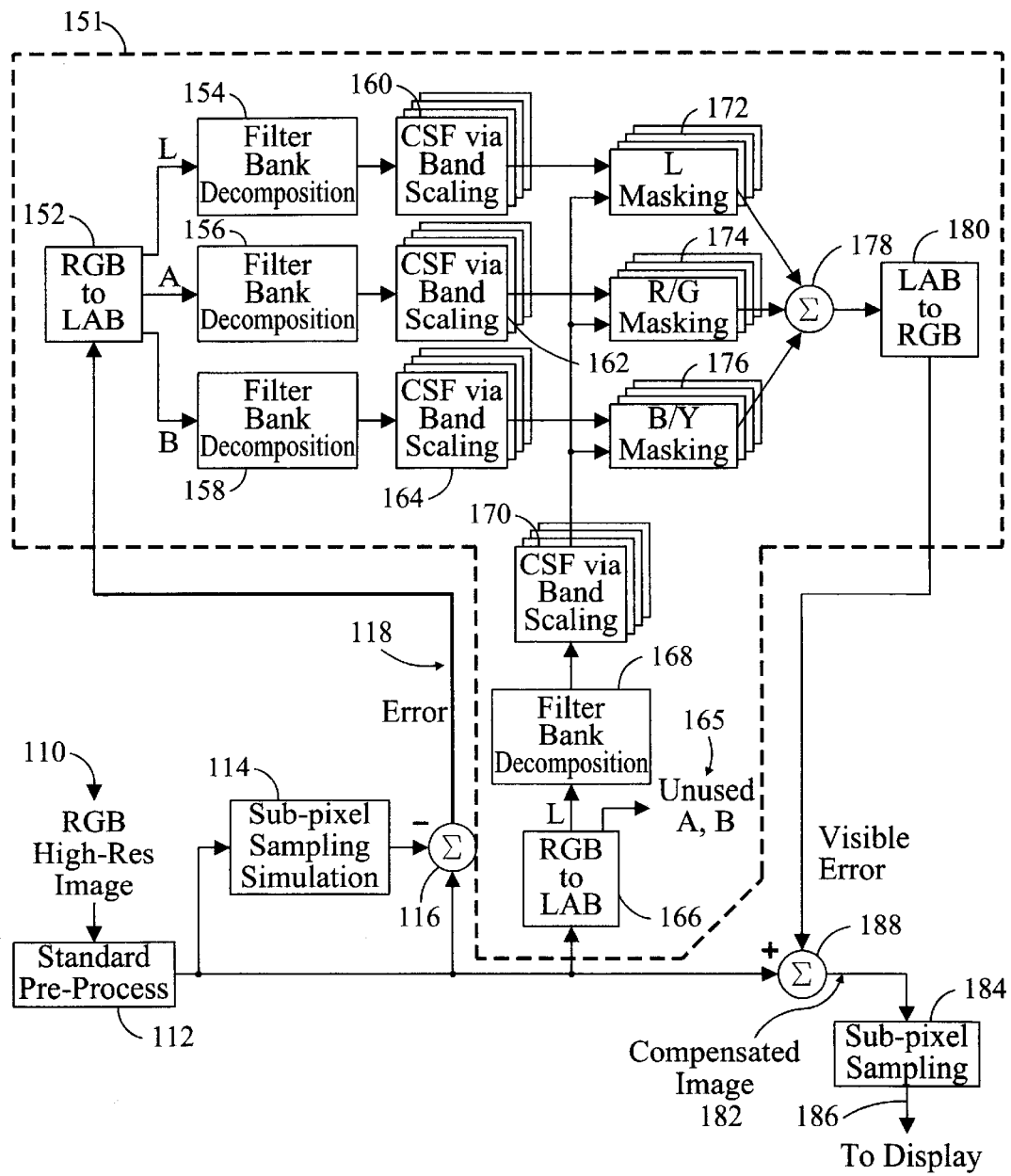
FIG. 12 is a block diagram of an embodiment of the present invention using a visual model which utilizes masking of chroma by luminance with a more accurate multi-channel, divided-frequency range visual model.

In reference to FIG. 12, a third embodiment of the present invention employs a more complete visual model 151 capable of predicting masking more accurately by the use of multiple frequency channels. Although only four channels are shown, their actual number may be greater or lesser, and they are typically both bandpass and limited in orientation. Example channels are described in S. Daly (1993), "Visible Differences Predictor," Ch. 14 of *Digital Images and Human Vision*, ed. By A. B. Watson, MIT Press; and J. Lubin (1995), "A Visual Discrimination Model for Imaging System Design and Evaluation," Ch. 10 of *Vision Models for Target Detection and Recognition*, ed. by E. Peli, World Scientific Press; these references being incorporated herein by reference. While this version is processor intensive, an increase in computational technology may render it more practical.

In this third embodiment, a high-resolution image 110 may be optionally preprocessed 112 before sub-pixel sampling simulation 114. As in previously described embodiments, sub-pixel sampling simulation 114 is used to determine the error 118 introduced by sub-pixel sampling. This error image is extracted 116 from the image through direct comparison of the "post-processed" image to the original image 110 at the original image resolution. Generally, the lower resolution "post-processed" image is increased in resolution for comparative purposes. Once this error image 118 is obtained, the error image 118 may be processed in a visual model 151 of this embodiment.

As in other embodiments, the error image 118 is converted from RGB or similar formats to a luminance-segregated format such as LAB 152. Using this type of format, luminance and chrominance data are separated into channels wherein each channel is further divided into frequency ranges using filter bank decomposition 154, 156 and 158. Each frequency range within each channel is then filtered using band scaling 160, 162 and 164.

Edge effects are also accounted for by converting the original source image to a luminance-segregated format such as LAB 166 followed by filter bank decomposition of the luminance channel 168 from the original image 110. Generally, the segregated chrominance channels 165 are not used in the masking process. Following filter bank decomposition 168, the ranges are filtered via band scaling or similar procedures as performed for the main error image channels 160, 162 and 164. These signals created through luminance channel band scaling 170 may be used for masking the various luminance and chrominance channels 172, 174 and 176. The masking computation is similar to that described in conjunction with FIG. 11, however, in the computation of this embodiment, the masking signal from a specific frequency band only affects the corresponding frequency band of the error image.

Once masking has been completed for each frequency range of each channel, the channels may be combined 178 to form a standard LAB or similar format file. This combined file may then be converted back to the original image format such as RGB 180. This RGB or similar file 180 represents the visible error introduced during sub-pixel sampling. The visible error 180 is subsequently subtracted 188 from or otherwise accounted for in the original high-resolution source file 110 thereby creating a compensated image 182.

When the compensated image 182 is run through sub-pixel sampling 184 the error introduced in the sampling process will cancel the visible error combined 188 into the original image 110 yielding a display image 186 with fewer errors than an image that is directly sampled without correction. This third embodiment uses a more accurate visual model with multi-channel capability that provides for masking of chroma by luminance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for converting a high-resolution image to a lower-resolution image with reduced visible errors, said method comprising the acts of:
   performing a sub-pixel sampling simulation on said high-resolution image to determine an error introduced into said high-resolution image as a result of sub-pixel sampling;
   isolating said error from said high-resolution image thereby creating an error image;
   modifying said error image with a visual model to remove invisible errors thereby creating a visible error image; and
   combining said visible error image with said high-resolution image to create a compensated image that will substantially cancel the error introduced as a result of subsequent sub-pixel sampling.

2. The method of claim 1 further comprising the act of performing sub-pixel sampling on said compensated image thereby creating a lower-resolution image of said high-resolution image which has fewer errors than if it were sampled directly.

3. The method of claim 1 wherein said visual model performs the acts of converting said error image into a luminance-segregated format and filtering a luminance channel.

4. The method of claim 1 wherein said visual model performs the acts of converting said error image into a luminance-segregated format and filtering luminance and chrominance channels.

5. The method of claim 4 wherein said luminance-segregated format is a LAB format.

6. The method of claim 1 wherein said visual model comprises the acts of:

converting said error image from an original image format to a luminance-segregated format;

separating luminance and chrominance channels of said error image;

filtering at least one of said luminance and chrominance channels to remove invisible errors;

combining said channels back into said luminance-segregated format thereby creating a filtered error image;

converting said filtered error image into said original image format for combination and comparison with said high-resolution image.

7. The method of claim 1 further comprising the act of pre-processing prior to said sub-pixel sampling simulation.

8. A visible error-reducing method for converting a high-resolution image to a lower-resolution image, said method comprising the acts of:

performing a sub-pixel sampling simulation on said high-resolution image in an original image format to determine an error introduced into said high-resolution image as a result of sub-pixel sampling;

isolating said error from said high-resolution image thereby creating an error image;

converting said error image to a luminance-segregated format wherein said error image comprises a luminance channel and at least one chrominance channel;

filtering said luminance channel;

converting said luminance-segregated, filtered error image back into said original image format thereby creating a visible error image; and using said visible error image to modify said high-resolution image thereby creating a compensated image that will substantially cancel an error introduced through sub-pixel sampling.

9. The method of claim 8 further comprising the act of performing sub-pixel sampling on said compensated image to produce a lower-resolution image with fewer errors than an image created by direct sub-pixel sampling of said high-resolution image.

10. The method of claim 8 wherein said luminance-segregated format is a LAB format.

11. A method for converting a high-resolution image to a lower-resolution image with fewer errors in the conversion process, said method comprising the acts of:

performing a sub-pixel sampling simulation on said high-resolution image in an original image format to determine an error introduced into said high-resolution image as a result of sub-pixel sampling;

isolating said error from said high-resolution image thereby creating an error image;

converting said error image to a luminance-segregated format wherein said error image comprises a luminance channel and at least one chrominance channel;

filtering at least one of said luminance and chrominance channels;

converting said high-resolution image to a luminance-segregated format wherein said high-resolution image comprises a luminance channel and at least one chrominance channel;

using said luminance channel from said high-resolution image as a basis for masking at least one of said luminance and chrominance channels of said error image;

masking at least one of said luminance and chrominance channels of said error image;

converting said luminance-segregated, filtered and masked error image back into said original image format thereby creating a visible error image; and using said visible error image to modify said high-resolution image thereby creating a compensated image that will substantially cancel an error introduced through sub-pixel sampling.

12. A method for converting a high-resolution image to a lower-resolution image with fewer errors in the conversion process, said method comprising the acts of:

performing a sub-pixel sampling simulation on said high-resolution image in an original image format to determine an error introduced into said high-resolution image as a result of sub-pixel sampling;

isolating said error from said high-resolution image thereby creating an error image;

converting said error image to a luminance-segregated format wherein said error image comprises a luminance channel and at least one chrominance channel;

dividing at least one of said luminance and chrominance channels into frequency ranges;

filtering at least one of said frequency ranges to remove invisible errors;

converting said high-resolution image to a luminance-segregated format wherein said high-resolution image comprises a luminance channel and at least one chrominance channel;

dividing said luminance channel of said high-resolution image into frequency ranges;

filtering at least one of said frequency ranges of said high-resolution image;

masking at least one of said luminance and chrominance frequency ranges of said error image using said divided and filtered luminance channel from said high-resolution image;

converting said error image back into said original image format after said masking thereby creating a visible error image; and using said visible error image to modify said high-resolution image thereby creating a compensated image that will substantially cancel an error introduced through sub-pixel sampling.

13. The method of claim 12 wherein said dividing is performed using filter bank decomposition.

14. The method of claim 12 wherein said filtering is performed using band scaling.

15. An error-reducing method for converting a high-resolution image to a lower-resolution image, said method comprising steps for:

performing a sub-pixel sampling simulation on said high-resolution image in an original image format to determine an error introduced into said high-resolution image as a result of sub-pixel sampling;

isolating said error from said high-resolution image thereby creating an error image;

converting said error image to a luminance-segregated format wherein said error image comprises a luminance channel and at least one chrominance channel;

filtering said luminance channel;

converting said luminance-segregated, filtered error image back into said original image format thereby creating a visible error image; and using said visible error image to modify said high-resolution image thereby creating a compensated image that will substantially cancel an error introduced through sub-pixel sampling.

16. An error-reducing system for converting a high-resolution image to a lower-resolution image, said system comprising:

a sub-pixel sampling simulator for performing a sub-pixel sampling simulation on said high-resolution image in an original image format to determine an error introduced into said high-resolution image as a result of sub-pixel sampling;

an error isolator for isolating said error from said high-resolution image thereby creating an error image;

a first image converter for converting said error image to a luminance-segregated format wherein said error image comprises a luminance channel and at least one chrominance channel;

a filter for filtering said luminance channel;

a second image converter for converting said luminance-segregated, filtered error image back into said original image format thereby creating a visible error image; and an image modifier for using said visible error image to modify said high-resolution image thereby creating a compensated image that will substantially cancel an error introduced through sub-pixel sampling.

17. A computer readable medium comprising instructions for converting a high-resolution image to a lower-resolution image with reduced errors, said instructions comprising the acts of:

performing a sub-pixel sampling simulation on said high-resolution image in an original image format to determine an error introduced into said high-resolution image as a result of sub-pixel sampling;

isolating said error from said high-resolution image thereby creating an error image;

converting said error image to a luminance-segregated format wherein said error image comprises a luminance channel and at least one chrominance channel;

filtering said luminance channel;

converting said luminance-segregated, filtered error image back into said original image format thereby creating a visible error image; and using said visible error image to modify said high-resolution image thereby creating a compensated image that will substantially cancel an error introduced through sub-pixel sampling.

18. A computer data signal embodied in an electronic transmission, said signal having the function of converting a high-resolution image to a lower-resolution image, said signal comprising instructions for:

performing a sub-pixel sampling simulation on said high-resolution image in an original image format to determine an error introduced into said high-resolution image as a result of sub-pixel sampling;

isolating said error from said high-resolution image thereby creating an error image;

converting said error image to a luminance-segregated format wherein said error image comprises a luminance channel and at least one chrominance channel;

filtering said luminance channel;

converting said luminance-segregated, filtered error image back into said original image format thereby creating a visible error image; and using said visible error image to modify said high-resolution image thereby creating a compensated image that will substantially cancel an error introduced through sub-pixel sampling.

19. A method for re-sampling an image having chromatic information and luminance information comprising the steps of:

(a) re-sampling said luminance information using a first re-sampling process;

(b) re-sampling said chromatic information of said image using a second re-sampling process, at least one of:

(i) re-sampling of said luminance information is different than said re-sampling of said chromatic information; and (ii) said second process processes pixels of said image in a manner different than said first process;

(c) attenuating at least a portion of lower frequency chromatic information with respect to at least a portion of higher frequency chromatic information that at least one of wold result from and that results from said re-sampling of said luminance information;

(d) combining said re-sampled luminance information, said re-sampled chromatic information, and at least a portion of said higher frequency chromatic information into a re-sampled image.

20. The method of claim 19 wherein said re-sampling of said luminance information is performed prior to said re-sampling of said luminance information.

21. The method of claim 19 wherein said re-sampling of said luminance information results in two chromatic channels, where each of said chromatic channels is attenuated in a different manner.

22. The method of claim 19 wherein said re-sampling of said chromatic information includes pixel re-sampling.

23. The method of claim 19 wherein said re-sampling of said luminance information of said image is performed in such a manner that chromatic aliasing is reduced from what it would have been had said re-sampling of said luminance information been re-sampled in the same manner as said re-sampling of said chromatic information.

24. The method of claim 19 wherein said re-sampling of said luminance information is performed on a luminance portion of said image free from substantial re-sampling of chromatic information of said image, while said re-sampling of said chromatic information is performed on a chromatic portion of said image free from substantial re-sampling of luminance information of said image.

* * * * *